(12) United States Patent
Yang (10) Patent No.: US 9,194,715 B2
(45) Date of Patent: Nov. 24, 2015

(54) SYSTEM AND RELATED METHOD FOR OFFERING NAVIGATION GUIDANCE

(71) Applicant: Shan-Chih Yang, Taipei (TW)

(72) Inventor: Shan-Chih Yang, Taipei (TW)

(73) Assignee: MITAC INTERNATIONAL CORP., Kuei-Shan Dist., Taoyuan (TW)

( * ) Notice: Subject to any disclaimer, the term of this patent is extended or adjusted under 35 U.S.C. 154(b) by 0 days.

(21) Appl. No.: 13/651,460

(22) Filed: Oct. 14, 2012

(65) Prior Publication Data

US 2014/0107915 A1 Apr. 17, 2014

(51) Int. Cl.
*G01C 21/36* (2006.01)

(52) U.S. Cl.
CPC ........ *G01C 21/3626* (2013.01); *G01C 21/3676* (2013.01); *G01C 21/3641* (2013.01)

(58) Field of Classification Search
CPC .. G01C 21/20; G01C 21/364; G01C 21/3676; G06Q 10/47; G06Q 30/241
USPC .......................................... 704/425; 701/425
See application file for complete search history.

(56) References Cited

U.S. PATENT DOCUMENTS

| | | | | |
|---|---|---|---|---|
| 5,781,714 | A * | 7/1998 | Collins et al. | 345/471 |
| 6,381,534 | B2 * | 4/2002 | Takayama et al. | 701/465 |
| 6,430,501 | B1 * | 8/2002 | Slominski | 701/429 |
| 7,266,450 | B2 * | 9/2007 | Glaza | 701/417 |
| 8,204,684 | B2 * | 6/2012 | Forstall et al. | 701/433 |
| 8,320,939 | B1 * | 11/2012 | Vincent | 455/456.1 |
| 8,417,447 | B2 * | 4/2013 | Barkai et al. | 701/410 |
| 8,489,326 | B1 * | 7/2013 | Na et al. | 701/426 |
| 8,504,290 | B2 * | 8/2013 | Bhatt | 701/475 |
| 2002/0065606 | A1 | 5/2002 | Kawai | |
| 2003/0158657 | A1 * | 8/2003 | Agnew et al. | 701/208 |
| 2005/0055159 | A1 | 3/2005 | Song | |
| 2005/0107993 | A1 * | 5/2005 | Cuthbert et al. | 703/2 |

(Continued)

FOREIGN PATENT DOCUMENTS

| | | |
|---|---|---|
| EP | 0 848 232 A2 | 6/1998 |
| EP | 0 848 232 A3 | 2/1999 |

(Continued)

OTHER PUBLICATIONS

GPSBabel web site, url: http://www.gpsbabel.org/htmldoc-development/fmt_gpx.html, Jun. 10, 2010.*

(Continued)

*Primary Examiner* — Yonel Beaulieu
*Assistant Examiner* — Krishnan Ramesh
(74) *Attorney, Agent, or Firm* — Winston Hsu; Scott Margo (57) ABSTRACT

A method of providing navigation guidance information to a user of a portable electronic device includes uploading a track file to a server, the track file containing a plurality of waypoints that form a track, adding a plurality of navigation points to the plurality of waypoints to produce a modified track file, the plurality of navigation points providing navigation guidance to the user of the portable electronic device, and the plurality of navigation points containing data for creating a graphical depiction of intersections associated with the turn-by-turn navigation guidance. The method further includes downloading the modified track file to the portable electronic device, and providing bi-directional turn-by-turn navigation guidance to the user of the portable electronic device when the user reaches each of the plurality of navigation points as the user follows the path indicated by the modified track file.

13 Claims, 6 Drawing Sheets

(56) References Cited

U.S. PATENT DOCUMENTS

| | | | |
|---|---|---|---|
| 2006/0025923 A1* | 2/2006 | Dotan et al. | 701/207 |
| 2006/0109144 A1* | 5/2006 | Xu et al. | 340/995.15 |
| 2006/0212217 A1* | 9/2006 | Sheha et al. | 701/209 |
| 2007/0050128 A1* | 3/2007 | Lee et al. | 701/200 |
| 2008/0177793 A1* | 7/2008 | Epstein et al. | 707/104.1 |
| 2008/0195978 A1* | 8/2008 | Wissenbach et al. | 715/854 |
| 2008/0262717 A1* | 10/2008 | Ettinger | 701/206 |
| 2010/0138153 A1* | 6/2010 | Abe et al. | 701/208 |
| 2010/0253542 A1* | 10/2010 | Seder et al. | 340/932.2 |
| 2010/0268463 A1* | 10/2010 | Kurtti et al. | 701/213 |
| 2010/0274855 A1* | 10/2010 | Wassingbo | 709/206 |
| 2010/0292886 A1* | 11/2010 | Szczerba et al. | 701/29 |
| 2011/0004400 A1 | 1/2011 | Kim | |
| 2011/0015860 A1* | 1/2011 | Nesbitt | 701/209 |
| 2011/0246055 A1* | 10/2011 | Huck et al. | 701/201 |
| 2011/0270654 A1* | 11/2011 | Banerjee et al. | 705/14.4 |
| 2012/0072204 A1* | 3/2012 | Nasri et al. | 704/9 |
| 2012/0089920 A1* | 4/2012 | Eick | 715/739 |
| 2012/0130638 A1* | 5/2012 | Uyama et al. | 701/533 |
| 2012/0136566 A1* | 5/2012 | Bamba | 701/410 |
| 2012/0158283 A1* | 6/2012 | Arastafar | 701/410 |
| 2013/0096819 A1* | 4/2013 | Tarnok | 701/428 |
| 2013/0261961 A1* | 10/2013 | Cardoso et al. | 701/467 |
| 2013/0304377 A1* | 11/2013 | Van Hende | 701/533 |
| 2014/0107915 A1* | 4/2014 | Yang | 701/425 |

FOREIGN PATENT DOCUMENTS

| | | |
|---|---|---|
| WO | 2004006610 A1 | 1/2004 |
| WO | 2008004857 A1 | 1/2008 |

OTHER PUBLICATIONS

Garmin Montana Owners Manual Apr. 2011, http://static.garmincdn.com/pumac/Montana_600_OM_EN.pdf.*

* cited by examiner

SYSTEM AND RELATED METHOD FOR OFFERING NAVIGATION GUIDANCE

BACKGROUND OF THE INVENTION

1. Field of the Invention

The present invention relates to a portable electronic device not having a map database stored internally and capable of outputting to a user navigation guidance instructions generated in and by a server.

2. Description of the Prior Art

Global Positioning System (GPS) based navigation devices are well known and are widely employed as in-car navigation devices. Common functions of a navigation device include providing a map database for generating navigation instructions that are then shown on a display of the navigation device. These navigation devices are often mounted on or in the dashboard of a vehicle using a suction mount or other mounting means.

The term "navigation device" refers to a device that enables a user to navigate to a pre-defined destination. The device may have an internal system for receiving location data, such as a GPS receiver, or may merely be connectable to a receiver that can receive location data. The device may compute a route itself, or communicate with a remote server that computes the route and provides navigation information to the device, or a hybrid device in which the device itself and a remote server both play a role in the route computation process. Portable GPS navigation devices are not permanently integrated into a vehicle but instead are devices that can readily be mounted in or otherwise used inside a vehicle. Generally (but not necessarily), they are fully self-contained—i.e. include an internal GPS antenna, navigation software and maps and can hence plot and display a route to be taken.

Currently, portable electronic devices employing GPS or other such location calculating services are increasingly used for outdoor activities such as hiking, running, or cycling. As a result, users now commonly use a portable electronic device when exercising.

Portable electronic devices used while exercising such as biking computers can be divided into the categories of high-end devices and low-end devices. The high-end portable electronic devices contain a position receiving device such as a GPS receiver as well as a map database inside the portable electronic devices. As a result, the high-end portable electronic devices can offer users the ability to plan routes as well as to track routes taken by the users. On the other hand, low-end portable electronic devices contain a position receiving device but do not contain a map database inside the portable electronic devices. Consequently, the low-end portable electronic devices can only track waypoints taken by the users.

Unfortunately, due to their added functionality and the included map databases, high-end portable electronic devices are more expensive than their low-end portable electronic devices counterparts. Also, high-end portable electronic devices consume more battery power. Furthermore, the low-end portable electronic devices are not able to offer much in the way of navigation guidance to users. Thus there exists a need in the market for low-end portable electronic devices that do not contain a map database yet still offer improved navigation guidance to users while exercising. There also exists a need for the navigation guidance provided by low-end portable electronic devices to not only provide information regarding direction to the next waypoint but also information to enable the user to be able to distinguish the directions of roads in intersections met along the journey.

SUMMARY OF THE INVENTION

It is therefore one of the primary objectives of the claimed invention to provided an improved system and related method for offering navigation guidance.

According to an exemplary embodiment of the claimed invention, a server for adding navigation guidance information to tracks is disclosed. The server includes a memory storing a map database comprising geographic data, a transceiver receiving a track file uploaded to the server, the track file containing a plurality of waypoints that form a track, and track processing software adding a plurality of navigation points to the plurality of waypoints to produce a modified track file, the plurality of navigation points being generated according to the map database in order to provide bi-directional turn-by-turn navigation guidance to a user when the user follows a path indicated by the modified track file, and the plurality of navigation points containing data for creating a graphical depiction of intersections associated with the turn-by-turn navigation guidance. The server also contains a processor executing the track processing software, controlling the transceiver to output the modified track file, and controlling operation of the server.

According to another exemplary embodiment of the claimed invention, a navigation system is disclosed. The navigation system includes a server comprising a first memory storing a map database comprising geographic data, a first transceiver receiving a track file uploaded to the server, the track file containing a plurality of waypoints that form a track, and track processing software adding a plurality of navigation points to the plurality of waypoints to produce a modified track file, the plurality of navigation points being generated according to the map database in order to provide bi-directional turn-by-turn navigation guidance to a user when the user follows a path indicated by the modified track file, and the plurality of navigation points containing data for creating a graphical depiction of intersections associated with the turn-by-turn navigation guidance. The server also comprises a first processor executing the track processing software, controlling the first transceiver to output the modified track file, and controlling operation of the server. The portable electronic device includes a second transceiver receiving the modified track file from the server, a second memory storing the modified track file, and a position receiving device receiving position signals indicating a current position of the portable electronic device. The portable electronic device also includes a display, guidance software outputting on the display a graphical depiction of the path indicated by the modified track file, the current position of the portable electronic device with respect to the path indicated by the modified track file according to the position signals received by the position receiving device, and turn-by-turn navigation guidance provided to the user of the portable electronic device when the user reaches each of the plurality of navigation points, and a second processor executing the guidance software and controlling operation of the portable electronic device.

As will be seen more clearly from the detailed description following below, the claimed portable electronic device is able to read navigation points in a modified track file produced by a server containing a map database. The navigation points in the modified track file contain navigation data that the portable electronic device uses to provide navigation guidance information to a user of the portable electronic device. Thus, despite the portable electronic device not having a map database stored in memory, the portable electronic device is still able to provide navigation guidance to the user.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
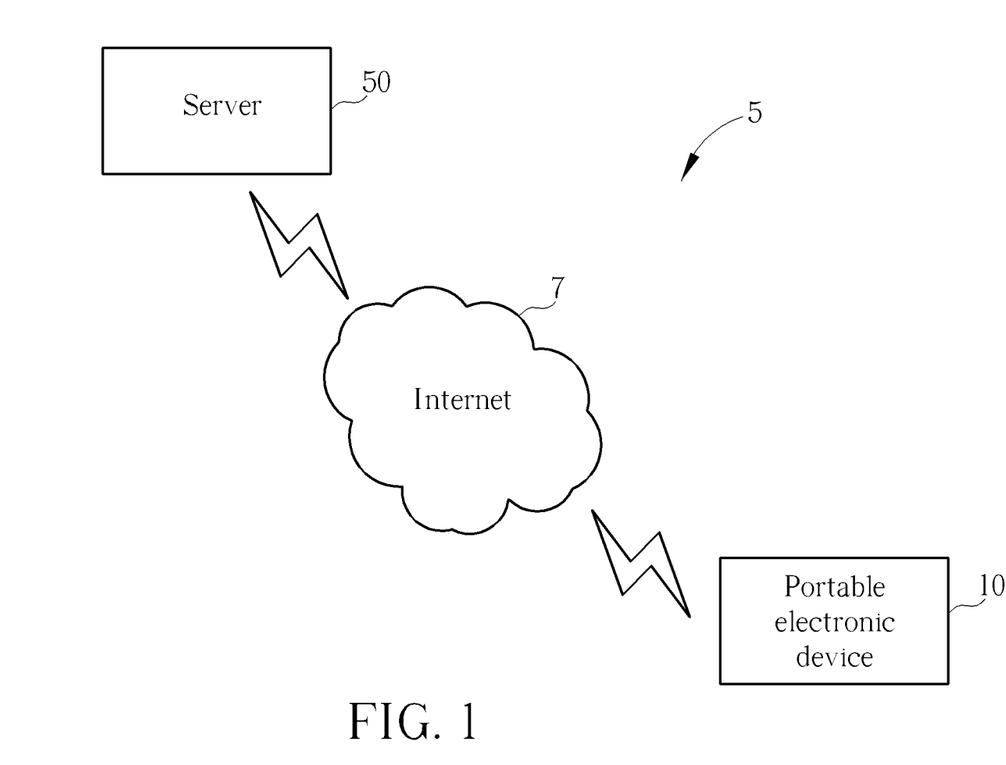
FIG. 1 is a block diagram of a navigation system according to the present invention.

Please refer to FIG. 1. FIG. 1 is a block diagram of a navigation system 5 according to the present invention. The navigation system 5 contains a server 50 and a portable electronic device 10 that may communicate with one another via the internet 7. As will be explained in greater detail below, the server 50 receives an uploaded track file containing a plurality of waypoints, and modifies the track file to add navigation points containing navigation information. This modified track file is then downloaded into the portable electronic device 10 for providing navigation guidance to a user of the portable electronic device 10.

Figure 2:
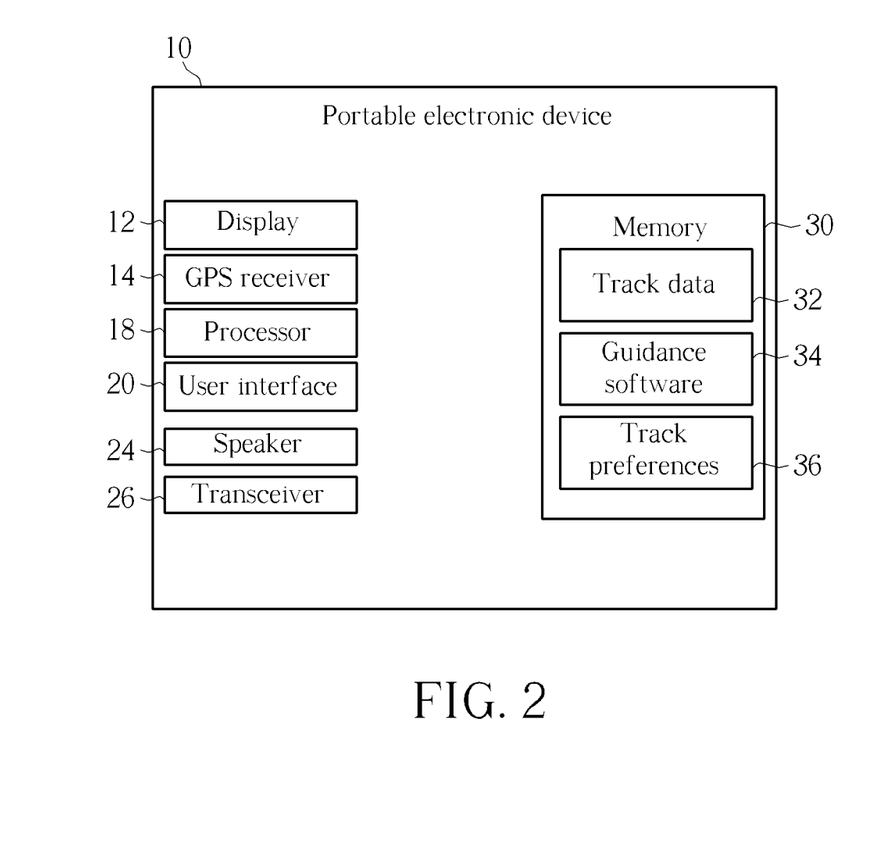
FIG. 2 is a functional block diagram of a portable electronic device according to the present invention.

Please refer to FIG. 2. FIG. 2 is a functional block diagram of the portable electronic device 10 according to the present invention. The portable electronic device 10 contains a display 12 which can be a touch sensitive display or a non-touch sensitive display, a GPS receiver 14 for receiving position signals indicating the current position coordinates of the portable electronic device 10, a processor 18 for controlling operation of the portable electronic device 10, a user interface 20, a speaker 24 for outputting audio instructions to the user, a transceiver 26 for communicating with the server 50 via the internet 7, and a memory 30. Instead of the speaker 24, a buzzer can also be used to provide audio feedback to the user. The GPS receiver 14 can likewise be replaced by other kinds of position receiving devices.

The memory 30 is used to store track data 32 such as the modified track files received from the server 50. The memory 30 also stores guidance software 34 used to display navigation guidance to the user as the user is following a path corresponding to a modified track file. User data such as track preferences 36 is also stored in the memory 30 in order to have a record of what display settings and navigation guidance the user prefers to use while operating the portable electronic device 10. The portable electronic device 10 can be created as a fitness watch wearable by a user, a personal navigation device, or a mobile phone. In addition to controlling the operation of the portable electronic device 10, the processor 18 also executes the guidance software 34.

Figure 3:
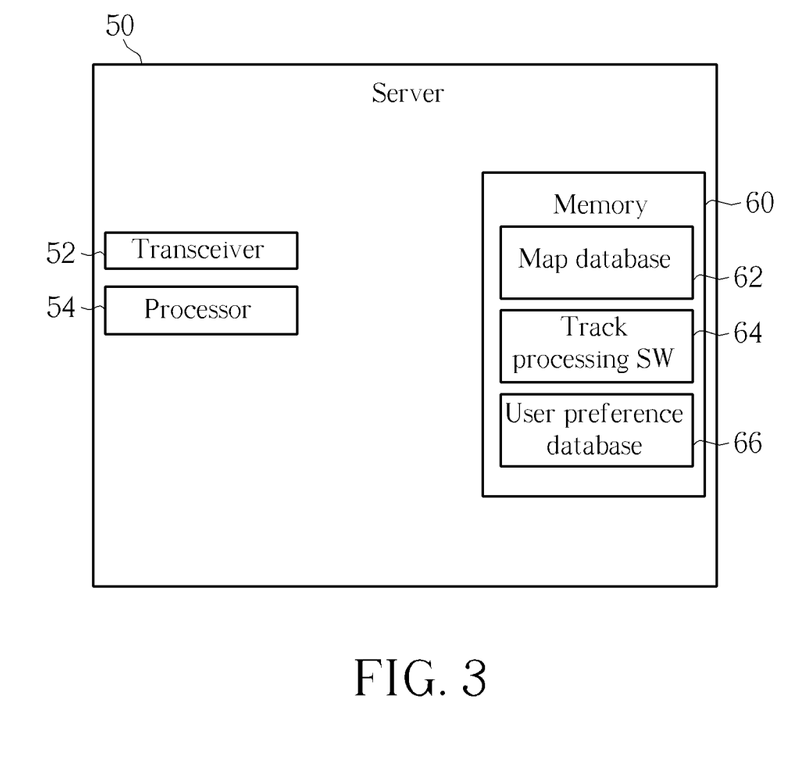
FIG. 3 is a functional block diagram of a server according to the present invention.

Please refer to FIG. 3. FIG. 3 is a functional block diagram of the server 50 according to the present invention. The server 50 contains a transceiver 52 for communicating with the portable electronic device 10 via the internet 7, a processor 52 for controlling operation of the server 50, and a memory 60. The memory 60 is used to store a map database 62 containing map data and points of interest. The memory 60 also stores track processing software 64 used to modify track files containing a plurality of waypoints in order to create modified track files containing both the waypoints and navigation points. As will be explained below, the added navigation points are usable by the portable electronic device 10 for providing navigation guidance to the user of the portable electronic device 10. The memory 60 also stores a user preference database 66 containing user preferences and settings such as specifying at what distance before an upcoming intersection the user wishes to be notified of the intersection. In addition to controlling the operation of the server 50, the processor 54 also executes the track processing software 64.

The transceiver 26 of the portable electronic device 10 and the transceiver 52 of the server 50 can communicate using a variety of different network protocols. The transceiver 26 and the transceiver 52 can use either a wired network connection or a wireless network connection. The transceiver 26 of the portable electronic device 10 preferably communicates with the internet 7 using a wireless network connection such as WiFi (IEEE 802.11) communication, although the portable electronic device 10 can also communicate with other computing devices using other protocols such the Bluetooth wireless protocol.

Figure 4:
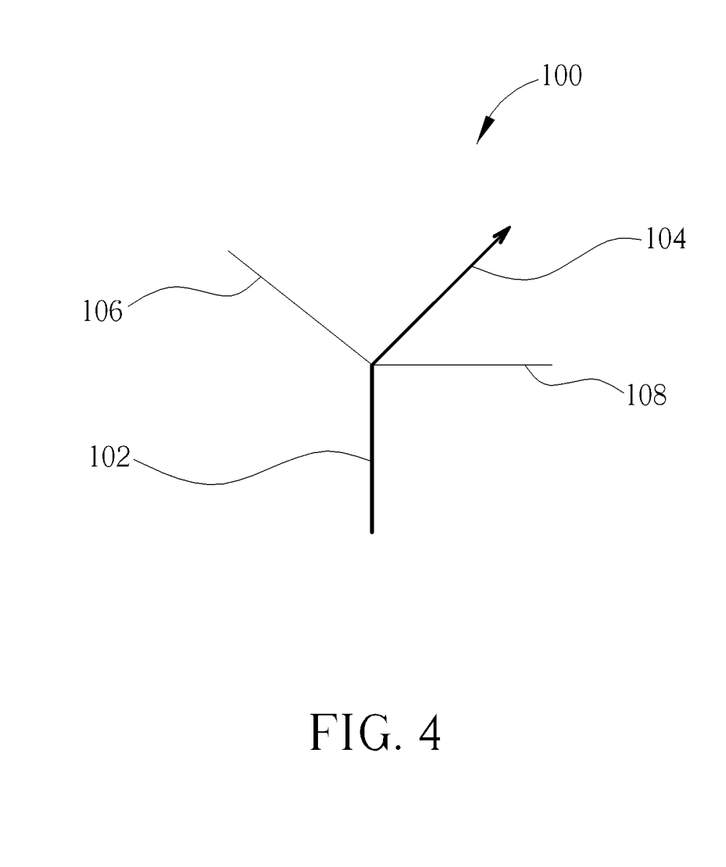
FIG. 4 illustrates a map of a path to be taken by a user.

Please refer to FIG. 4. FIG. 4 illustrates a map 100 of a path to be taken by a user along road 102 and road 104. The map 100 contains roads 102, 104, 106, and 108 which all meet at a same intersection. The dark lines on road 102 and extending to road 104 indicate the path that the user of the portable electronic device 10 is to take. Since roads 102, 104, 106, and 108 all meet at the same intersection, the user of the portable electronic device 10 will be provided with navigation guidance before approaching the intersection. Whenever the user of the portable electronic device 10 comes across an intersection the user should be told ahead of time which road to turn onto, and should preferably be shown a map of the intersection so that the user can better visualize which road to select and which roads to avoid.

Figure 5:
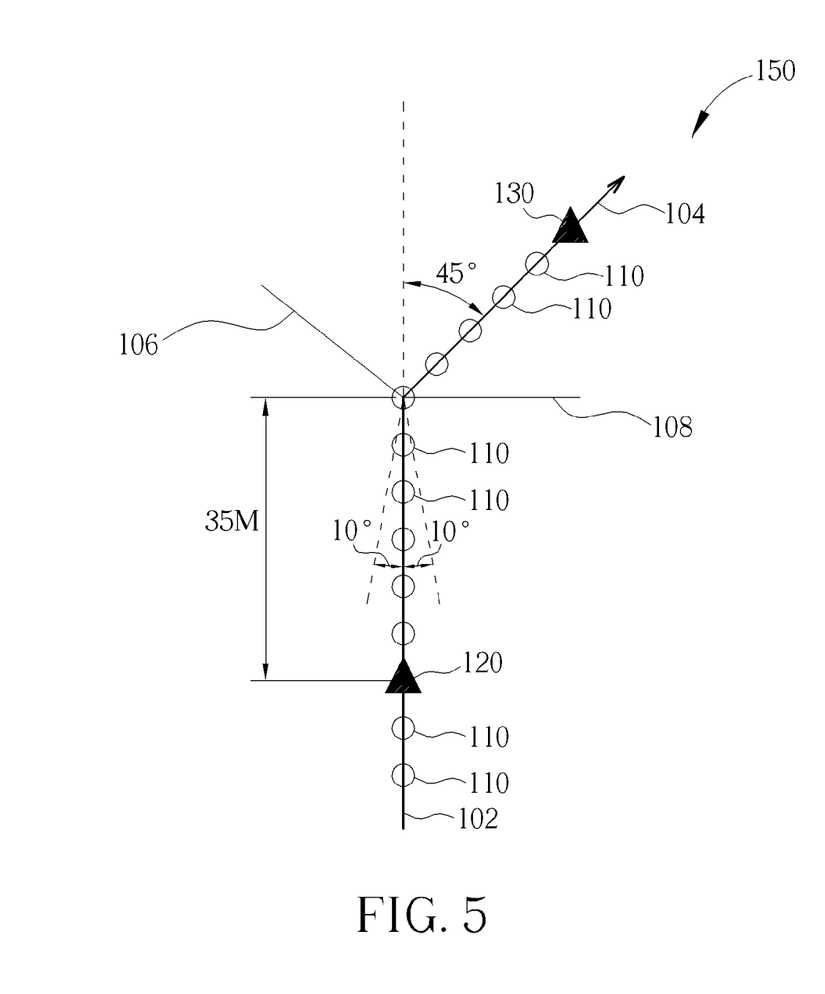
FIG. 5 illustrates a detailed map of the path to be taken by the user.

Please refer to FIG. 5. FIG. 5 illustrates a detailed map 150 of the path to be taken by the user along road 102 and road 104. The path to be taken is created as a track containing a plurality of waypoints 110 along road 102 and road 104. The waypoints 110 of the track provide position information such as longitude and latitude coordinates along the track, and allow the user to see a general shape of the track to be followed. However, the waypoints 110 do not offer any turn-by-turn navigation for the user of the portable electronic device 10.

The plurality of waypoints 110 can be created by a user as part of a track file. The user can create the track file on either the portable electronic device 10 or a separate computer. Once the track file is created, the user can upload the track file to the server 50 in order to have the server 50 create a modified track file containing a plurality of navigation points 120 and 130 in addition to the waypoints 110. The modified track file is then downloaded to the track data 32 section of memory 30 for allowing the user to follow the path indicated by the modified track file.

As shown in FIG. 5, the map 150 contains the waypoints 110 as well as navigation point 120 and navigation point 130. The navigation point 120 is used for providing navigation guidance to the user when the user travels on road 102 and approaches the intersection of roads 102, 104, 106, and 108. On the other hand, the navigation point 130 is used for providing navigation guidance when the user is traveling in the other direction. That is, the navigation point 130 provides navigation guidance to the user when the user travels on road 104 and approaches the intersection of roads 102, 104, 106, and 108. In this way, the navigation points 120 and 130 provide bi-directional navigation guidance to the user of the portable electronic device 10.

When the user of the portable electronic device 10 is following the track of the modified track file, the guidance software 34 compares the current position of the portable electronic device 10 as indicated by the GPS receiver 14 to the coordinates of the waypoints 110 and the navigation points 120 and 130. For instance, when the portable electronic device 10 reaches the navigation point 120, the guidance software 34 will extract the navigation guidance data associated with the navigation point 120 and present this navigation guidance data to the user.

When the user's path follows a road without any intersections, the user does not need any special turn-by-turn navigation instructions. Therefore, the navigation points 120 and 130 are only needed before the user comes across an intersection. In order to give the user adequate time to prepare for the upcoming intersection, the navigation points 120 and 130 are preferably positioned a predetermined distance before the intersection, such as 35 meters before the intersection. As shown in FIG. 5, the navigation point 120 is positioned before the intersection of roads 102, 104, 106, and 108 when the user approaches the intersection from road 102. Conversely, the navigation point 130 is positioned before the intersection of roads 102, 104, 106, and 108 when the user approaches the intersection from road 104.

The modified track file can be created using a variety of different formats. One popular format is the GPS eXchange (GPX) format which organizes data in an Extensible Markup Language (XML) format.

Whereas the data associated waypoints 110 can be limited to the latitude and longitude coordinates of the waypoints 110, additional data should be associated with the navigation points 120 and 130 in order to provide the user of the portable electronic device 10 with navigation assistance. New non-standard GPX tags can be created to store the additional data associated with the navigation points 120 and 130 that is not associated with the waypoints 110. For example, the data associated with the navigation point 120 may include the latitude and longitude coordinates, a "from direction" that the user will be coming from before the intersection, a "to direction" that the user will be traveling to after the intersection, one or more directions to avoid for indicating the direction of other streets at the intersection that are not to be taken, and an indication of a distance to the intersection.

Continuing with the example of the navigation point 120, the "from direction" would be indicated as 180 degrees if the upward direction in map 150 is 0 degrees and the bottom direction is 180 degrees. The "to direction" would be 45 degrees since road 104 is 45 degrees to the right of the upward direction. The directions to avoid would be 90 degrees for road 108 as well as 315 degrees for road 106.

An entrance angle can also be specified in which the user should approach the navigation point 120 at an angle within 10 degrees on either side of the road 102. If the user is not within this entrance angle the guidance software 34 may be configured to not display the navigation guidance information associated with the navigation point 120.

To continue the example above, when the user is traveling along road 102 with the portable electronic device 10 toward the intersection of roads 102, 104, 106, and 108 and the user comes across navigation point 120 the map 150 will be displayed on the display 12 of the portable electronic device 10. Information regarding the intersection of roads 102, 104, 106, and 108 will be extracted from the navigation point 120. Using the "to direction", the "from direction", the directions to avoid, the distance to the intersection, and other data associated with the navigation point 120 is used to display the roads 102, 104, 106, and 108 and other information associated with the intersection. Alternatively, instead of generating a map based on the data stored in the navigation points 120 and 130, the GPX data for navigation points 120 and 130 can be used to store a small map image file corresponding to the intersection of roads 102, 104, 106, and 108.

Since the guidance software 34 only displays turn-by-turn navigation when coming across one of the navigation points 120 and 130, the guidance software 34 does not need to be continuously looking ahead for other navigation points that may be coming up later on. This allows the portable electronic device 10 to save processing time since the user can be notified about upcoming intersections only when the location of the portable electronic device 10 matches the location of one of the navigation points 120 and 130. Since the navigation points 120 and 130 are positioned ahead of the intersection by the predetermined distance, the user is still provided with enough notice about the upcoming intersection.

Navigation guidance can be provided for all intersections along the path, even those intersections where the user simply needs to keep going straight instead of turning. In this way, the user will feel more confident about passing through an intersection if the user has confirmation about which way the path leads.

Figure 6:
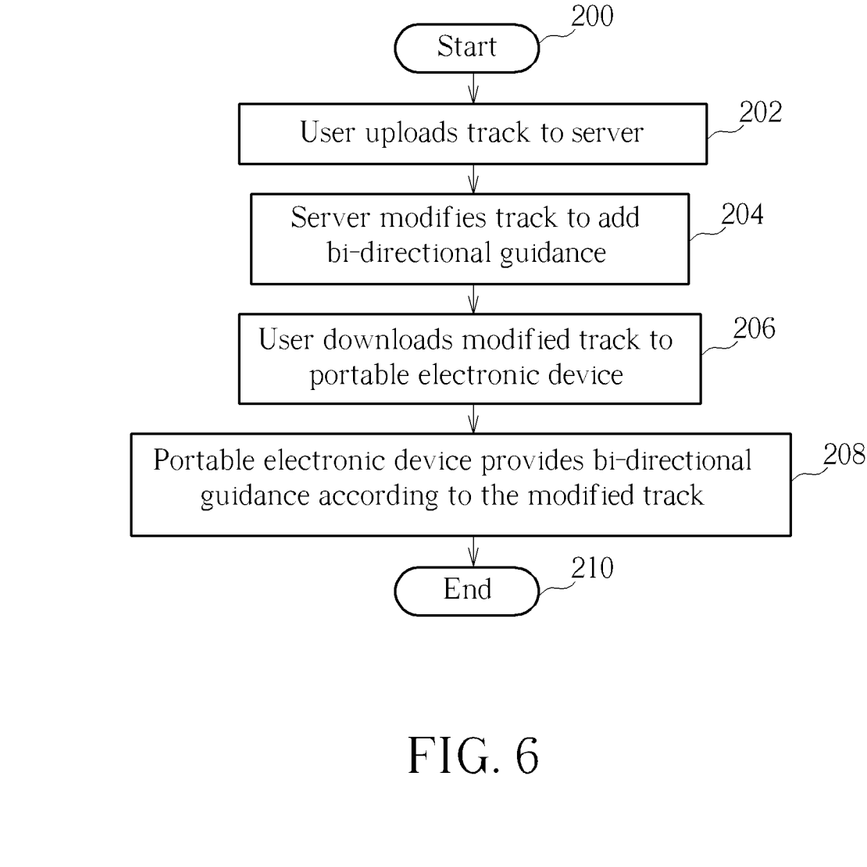
FIG. 6 is a flowchart illustrating a method of providing navigation guidance information to the user of the portable electronic device according to the present invention.

Please refer to FIG. 6. FIG. 6 is a flowchart illustrating a method of providing navigation guidance information to the user of the portable electronic device 10 according to the present invention. Steps contained in the flowchart will be explained below.

Step 200: Start.

Step 202: The user uploads a track file to the server 50. The track file contains the plurality of waypoints indicating the path that the user should follow.

Step 204: The server 50 analyzes the track file and determines the locations of intersections along the path indicated by the waypoints. For each intersection found, the server 50 generates a navigation point on each side of the intersection along the path to be followed in order to provide bi-directional navigation guidance to the user. The navigation points contain navigation guidance information for providing the user with turn-by-turn navigation in a graphical format when the user approaches each intersection along the path. The track file is then modified to add the navigation points to the existing collection of waypoints for producing a modified track file.

Step 206: The user of the portable electronic device 10 downloads the modified track file to the track data 32 section of memory 30 for storing the modified track file for future use.

Step 208: The guidance software 34 of the portable electronic device 10 reads the modified track file as the user follows the path indicated by the modified track file. Using the navigation guidance information contained in the navigation points, the guidance software 34 presents the user with a graphical depiction of the intersections while also providing turn-by-turn navigation guidance to the user for each intersection that the user comes across. If the user wishes to return along the same path, the user can still enjoy the benefits of the navigation guidance since the navigation points in the modified track file provide bi-directional navigation guidance.

Step 210: End.

The server 50 allows all users to upload their track records to the server 50. The server 50 also includes a search function to allow a user to search for tracks uploaded to the server 50 by all users. For instance, if the user wishes to find a track from location A to location B, the user may search the server 50 for a track matching the user's search criteria. After finding a suitable track, the user can download a track containing data from location A to location B. The downloaded track may be a complete track uploaded by another user or may be only the portion of an uploaded track that is located between location A and location B. From the perspective of the user searching for and downloading the track, the downloaded track will be a modified track file generated by the server 50 containing waypoints and navigation points from location A to location B. The modified track file will also contain a reverse track from location B back to location a.

It will be appreciated that through the use of the modified track file containing the navigation points, the portable electronic device 10 can provide the user with navigation guidance without needing to store a map database in the memory 30 of the portable electronic device 10. Therefore, even relatively low-end devices can take advantage of the benefits of the present invention, thereby lowering the cost to users while at the same time providing the users with bi-directional navigation guidance.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A server for adding navigation guidance information to tracks, the server comprising:
   a memory storing a map database comprising geographic data;
   a transceiver receiving a track file uploaded to the server, the track file containing at least three user-defined waypoints that form a track;
   track processing software modifying the track file to produce a modified track file, the modified track file comprising the at least three user-defined waypoints and a plurality of navigation points, the plurality of navigation points being generated according to the map database and containing navigation data providing bi-directional turn-by-turn navigation guidance to a user of a portable electronic device storing the modified track file when the user of the portable electronic device follows a path indicated by the modified track file, and the plurality of navigation points containing graphical data for creating a graphical depiction of intersections associated with the turn-by-turn navigation guidance, wherein each navigation point of the plurality of navigation points comprises data indicating a distance from the navigation point until an intersection to which the navigation point corresponds; and
   a processor executing the track processing software, controlling the transceiver to output the modified track file, and controlling operation of the server.

2. The server of claim 1, further comprising a user preference database for indicating the user's preferences in how the server generates the modified track file.

3. The server of claim 2, wherein the user preference database stores the user's preferences regarding at what distance before upcoming intersections the user wishes to be notified of the intersections.

4. The server of claim 1, wherein each navigation point of the plurality of navigation points comprises data indicating longitude and latitude coordinates of the navigation point.

5. The server of claim 1, wherein each navigation point of the plurality of navigation points comprises data indicating a direction from the intersection that the user should avoid traveling.

6. The server of claim 1, wherein the modified track file is stored in a format conforming to the GPS eXchange (GPX) format, and the modified track file stored in the GPX format contains non-standard GPX tags for indicating navigational data associated with the navigation points.

7. A navigation system, comprising:
   a server comprising:
      a first memory storing a map database comprising geographic data;
      a first transceiver receiving a track file uploaded to the server, the track file containing at least three user-defined waypoints that form a track;
      track processing software modifying the track file to produce a modified track file, the modified track file comprising the at least three user-defined waypoints and a plurality of navigation points, the plurality of navigation points being generated according to the map database and containing navigation data providing bi-directional turn-by-turn navigation guidance to a user when the user follows a path indicated by the modified track file, and the plurality of navigation points containing graphical data for creating a graphical depiction of intersections associated with the turn-by-turn navigation guidance, wherein each navigation point of the plurality of navigation points comprises data indicating a distance from the navigation point until an intersection to which the navigation point corresponds; and
      a first processor executing the track processing software, controlling the first transceiver to output the modified track file not containing a map database, and controlling operation of the server; and
   a portable electronic device comprising:
      a second transceiver receiving the modified track file from the server;
      a second memory storing the modified track file received from the server, wherein the portable electronic device does not contain its own locally-stored map database;
      a position receiving device receiving position signals indicating a current position of the portable electronic device;
      a display;
      guidance software outputting on the display the graphical depiction of the path indicated by the modified track file, the current position of the portable electronic device with respect to the path indicated by the modified track file according to the position signals received by the position receiving device, and turn-by-turn navigation guidance extracted from the navigation points of the modified track file when the user reaches each of the plurality of navigation points, wherein the graphical data consists of lines and arrows, and the lines and arrows indicate a "from direction" that the user is coming from and a "to direction" indicating where the user should travel to along the path indicated by the modified track file; and
      a second processor executing the guidance software and controlling operation of the portable electronic device.

8. The navigation system of claim 7, wherein the server further comprises a user preference database for indicating the user's preferences in how the server generates the modified track file.

9. The navigation system of claim 8, wherein the user preference database stores the user's preferences regarding at what distance before upcoming intersections the user wishes to be notified of the intersections.

10. The navigation system of claim 7, wherein each navigation point of the plurality of navigation points comprises data indicating longitude and latitude coordinates of the navigation point.

11. The navigation system of claim 7, wherein each navigation point of the plurality of navigation points comprises data indicating a direction from the intersection that the user should avoid traveling.

12. The navigation system of claim 7, wherein the portable electronic device does not contain a map database.

13. The navigation system of claim 7, wherein the modified track file is stored in a format conforming to the GPS eXchange (GPX) format, and the modified track file stored in the GPX format contains non-standard GPX tags for indicating navigational data associated with the navigation points.

* * * * *